UNITED STATES PATENT OFFICE.

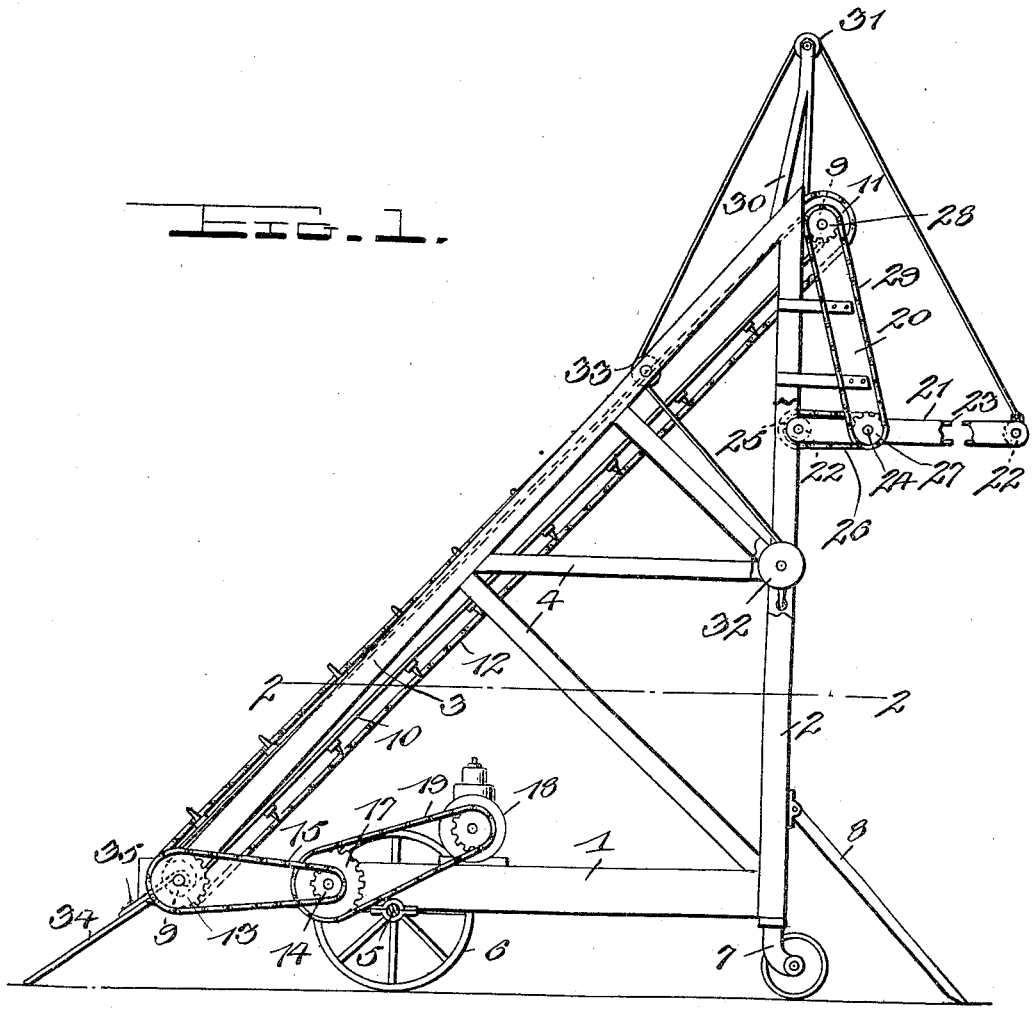

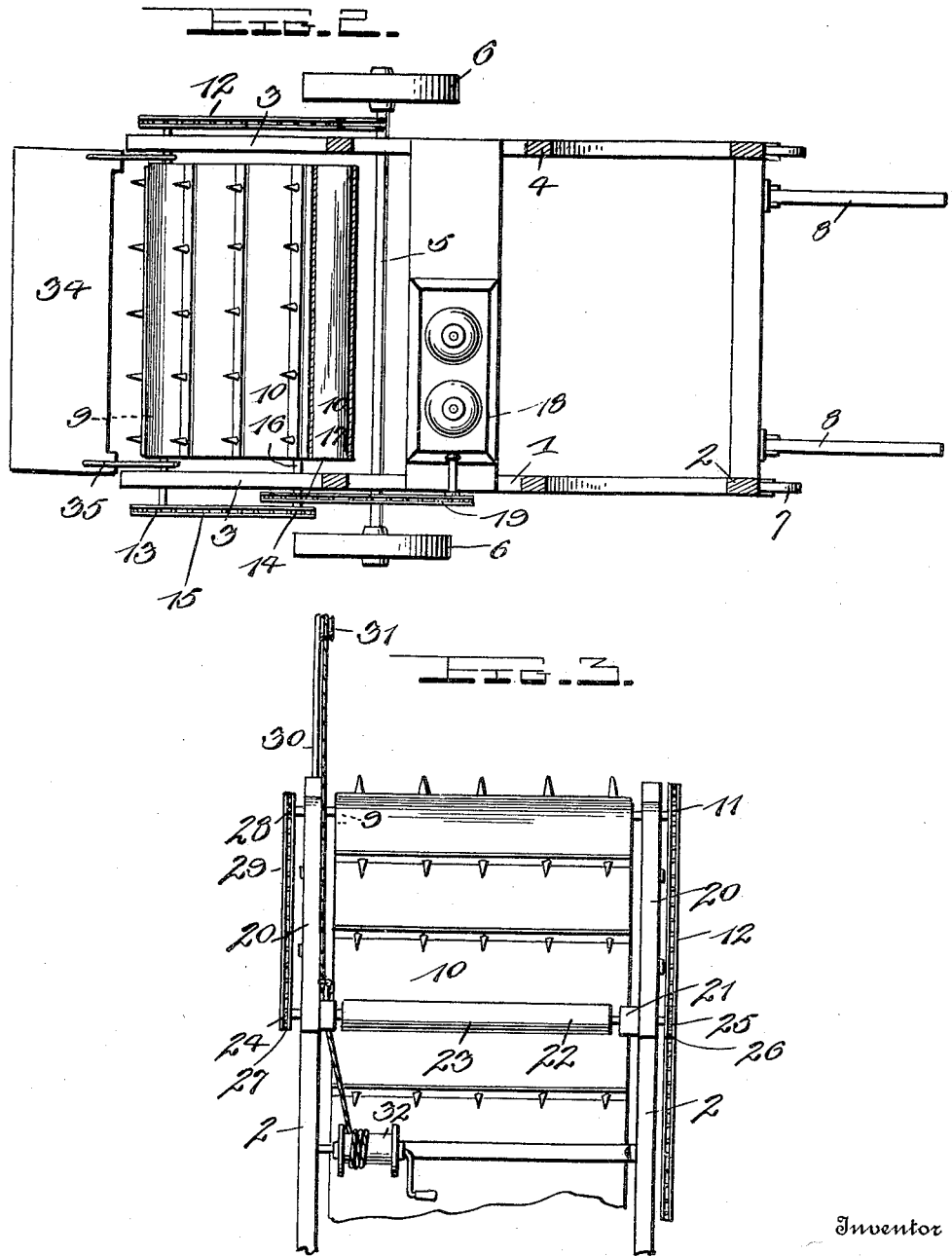

ANDREW J. DAVIDSON, OF BAGGS, WYOMING, ASSIGNOR OF ONE-FOURTH TO GEORGE W. DAVIDSON AND ONE-FOURTH TO CARL DAVIDSON, BOTH OF BAGGS, WYOMING.

HAY-STACKER.

1,103,492.  Specification of Letters Patent.  Patented July 14, 1914.

Application filed October 2, 1912. Serial No. 723,602.

*To all whom it may concern:*

Be it known that I, ANDREW J. DAVIDSON, a citizen of the United States, residing at Baggs, in the county of Carbon and State of Wyoming, have invented certain new and useful Improvements in Hay-Stackers, of which the following is a specification, reference being had to the accompanying drawings.

This invention relates to stackers and more particularly to the class of hay stackers wherein the principal object of the invention is the provision of a hay stacker embodying a main conveyer and a distributing conveyer disposed below the upper end of the main conveyer, said stacker being provided with means for raising or lowering the outer end of the distributing conveyer.

A further object of the invention is the provision of a machine of the above stated character which embodies conveyer belts, one of said belts being adjustable through the medium of a windlass, and both of said conveyers being driven through the medium of a suitable gas engine carried by the machine.

A still further object of the invention is the provision of a hay stacker which can be wheeled to any desired place, securely braced and readily and effectively operated.

With these and other objects in view as will appear as the description proceeds, the invention comprises the various novel features of construction, combination and arrangement of parts as will be more fully described hereinafter and set forth with particularly in the appended claim.

Referring to the drawings, Figure 1 is a side elevation of my improved hay stacker; Fig. 2 is a sectional plan taken on the line 2—2 of Fig. 1; Fig. 3 is a rear end elevation of the machine.

Similar characters of reference are used to denote like parts throughout the accompanying drawings and the annexed specification.

Referring more particularly to the drawings, my improved hay stacker is shown to consist of substantially a triangular frame work which embodies spaced horizontally disposed beams 1, spaced vertical uprights 2 and a pair of spaced inclined bars 3, all of said members being suitably braced by braces 4. The forward end of the frame work has journaled therein an axle 5 upon the ends of which are mounted the traction wheels 6. The rear end of the frame work is supported through the medium of caster wheels 7 the uprights 2 having pivotally secured thereto suitable brace bars 8, the lower ends of which are adapted to be forced into the ground to firmly brace the frame work of the machine when the latter is in operation.

Journaled in the upper and lower ends of the spaced side bars 3 are rollers 9 around which passes a suitable conveyer belt 10, which latter is provided with rows of spikes or teeth for carrying the hay up the belt that is deposited thereon. These rollers 9 are provided on their outer ends with sprockets 11 upon which is mounted a drive chain 12. The lower roller 9 has mounted on its end adjacent the sprocket 11 an additional sprocket wheel 13 which latter is connected to a sprocket 14 through the medium of a drive chain 15. The sprocket 14 is arranged upon a transversely extending countershaft 16 which latter is provided with a sprocket 17 and is connected directly to the drive shaft of a suitable gas engine 18 by a drive chain 19 whereby the conveyer belt 10 may be readily and effectively driven.

Depending from the upper end of the side bars 3 are spaced supporting bars 20 which have pivotally connected between their lower ends the spaced side bars 21 of an auxiliary or distributing conveyer. This conveyer, as shown, is pivoted intermediate its ends and at a point adjacent its rear end to the depending supports 20 and has journaled in its opposite ends rollers 22 around which is passed a conveyer belt 23. The pivot of this distributing conveyer, as shown, is in the form of a revoluble shaft 24. This shaft 24 and the rear roller 22 has provided on its ends sprocket wheels 25, which latter are connected together by a chain 26. The opposite end of the shaft 24 is provided with a sprocket wheel 27 which is connected to a sprocket wheel 28 on the opposite end of the upper roller 9 by a suitable drive chain 29. From this it will be apparent that the distributing conveyer may be driven simultaneously with the main conveyer 12 and by its connection therewith. A depending bracket 30 is mounted upon the upper end of one of the side bars 3 of the main conveyer and is provided in its upper end with a pulley 31. A windlass 32 is revolubly supported upon one of the uprights 2 and has the cord or rope thereof threaded upwardly over a guide pulley 33, over the pulley 31 and thence downwardly and connected to the outer end of the distributing conveyer whereby the distributing conveyer may be readily raised or lowered by the manipulation of the windlass. When the machine is inoperative the distributing conveyer may be swung upwardly into substantially a vertical position so as to be out of the way to permit of the easy and ready transportation of the machine from place to place.

A hay board 34 is disposed at the front of the machine at an inclination thereto and is provided with hooks 35 at its upper end, which latter are adapted to be hooked over the opposite ends of the lower roller shaft 9 to support the upper end of the hay board in close proximity to the lower end of the main conveyer while the lower end of the board rests upon the ground. The upper longitudinal edge of the board may be provided with inwardly extending slots to permit of the teeth upon the conveyer belt passing therethrough.

From the foregoing description taken in connection with the accompanying drawings, the advantages of construction and the method of operation will be readily apparent to those skilled in the art to which the invention relates, and while I have described the principle of operation of the invention, together with the device which I now consider to be the best embodiment thereof, I desire to have it understood that the device is hereby illustrative and that such changes may be made when desired as are within the scope of the appended claim.

Having thus fully described my invention, what I claim as new is:

A device of the character described including a frame, spaced supporting bars positioned to the rear of the frame and adjacent the upper extremity thereof, braces connecting such bars and the frame whereby such bars are maintained in fixed position, a shaft mounted in the upper end portion of such bars, a second shaft mounted on the frame adjacent the forward end thereof, a conveyer operatively engaged with such shaft, driving means operatively connected with one of such shafts, a shaft mounted in the lower ends of the supporting bars, an operative connection between such shaft and the conveyer whereby the same may be caused to rotate in unison therewith, side bars pivotally supported intermediate their length by the lowermost shaft of the supporting bars, the portions of such side bars to the rear of the shaft being disposed beneath the upper extremity of the conveyer, shafts interposed between and mounted in the opposite end portions of the side bars, a conveyer passing around such shafts, an operative connection between the lowermost shaft of the supporting bars and one of the shafts of the side bars whereby the same may be caused to rotate in unison, and means whereby the side bars may be adjusted about the lowermost shaft of the supporting bars.

In testimony whereof I hereunto affix my signature in the presence of two witnesses.

ANDREW J. DAVIDSON.

Witnesses:
C. S. MERRILL,
E. H. CARR.

---

Copies of this patent may be obtained for five cents each, by addressing the "Commissioner of Patents, Washington, D. C."